United States Patent [19]
Grimes et al.

[11] 3,919,406
[45] Nov. 11, 1975

[54] THERMOCHEMICAL PRODUCTION OF HYDROGEN

[75] Inventors: Warren R. Grimes; Carlos E. Bamberger, both of Oak Ridge, Tenn.

[73] Assignee: The United States of America as represented by the United States Energy Research and Development Administration, Washington, D.C.

[22] Filed: July 10, 1974

[21] Appl. No.: 487,323

[52] U.S. Cl. ................ 423/648; 423/481; 423/493; 423/497; 423/500
[51] Int. Cl.² ........................ C01B 1/02; C01B 1/26
[58] Field of Search ........... 423/648, 498, 481, 493, 423/497, 500

[56] References Cited
UNITED STATES PATENTS
1,489,525  4/1924  Goldschmidt........................ 423/498

OTHER PUBLICATIONS
"Treatise on Inorganic Chemistry," by H. Remy, Vol. 2, 1956, Ed., p. 373, Elsevier Pub. Co., New York.
"Encyclopedia of Chemical Reactions" by C. A. Jacobson, Vol. 3, 1949, Ed., pp. 319 and 337, Reinhold Pub. Corp., New York.
J. W. Mellor's "A Comprehensive Treatise on Inorganic and Theoretical Chem.," Vol. 3, pp. 161 and 162.

*Primary Examiner*—Edward Stern
*Attorney, Agent, or Firm*—Dean E. Carlson; David S. Zachry; John B. Hardaway

[57] ABSTRACT

Hydrogen is produced by reacting cuprous chloride with hydrochloric acid. The reaction may be combined to form a thermochemical closed process for producing hydrogen by a series of four reactions utilizing chlorides of copper and magnesium, hydrochloric acid, and magnesium oxide to break water down into its constituent elements.

4 Claims, 1 Drawing Figure

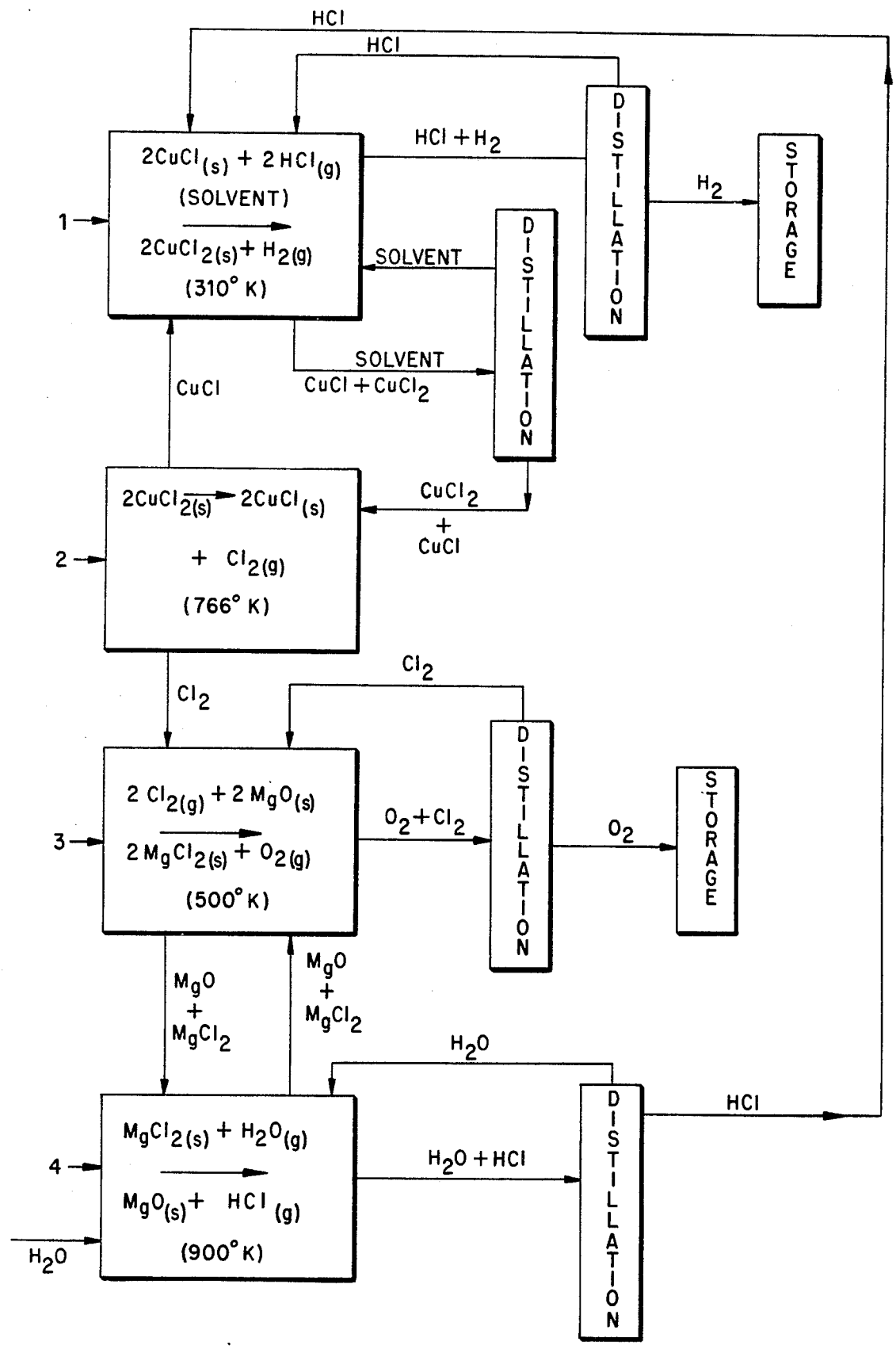

THERMOCHEMICAL PRODUCTION OF HYDROGEN

BACKGROUND OF THE INVENTION

This invention was made in the course of, or under, a contract with the United States Atomic Energy Commission. It relates generally to a thermochemical process for producing hydrogen.

Hydrogen is presently considered to be a promising energy source for future applications. Systems utilizing conventional hydrocarbon fuels can generally be adapted for hydrogen utilization. Experimental automobiles, for example, are presently operating utilizing hydrogen as a fuel with a modified internal combustion engine. Hydrogen is also considered a likely substitute for natural gas. The use of hydrogen in such systems solves many problems which are created by present energy sources. The combustion of hydrogen, for example, produces only water as a product, thus eliminating the harmful products created by the combustion of fossil fuels. While causing no air pollution, hydrogen is also a replacement for energy sources whose supply is being rapidly diminished.

Gasification of coal is also an important process for the production of future energy sources. Most of the known processes require hydrogen as a reactant. The feasibility of such processes will thus depend upon the availability of a large supply of hydrogen.

The conventional method for producing hydrogen is by electrolysis of water. However, this method is not feasible for use on a large-scale basis because of the high cost of electricity involved and the general futility of ultimately using one energy source to produce its replacement. Hydrogen may also be produced by reacting steam with coal in the presence of a suitable catalyst and at an elevated temperature. However, at present, the priorities for coal make such a conversion impractical.

Thermochemical processes whether closed or open have also been suggested as a means of producing hydrogen. Such processes comprise a series of reactions carried out at different temperatures. The net effect of such reactions is to break water down into its constituent elements. In order for the various reactions to proceed, heat must be supplied. Ideally, this heat could be supplied directly from the heat of a nuclear reactor. However, no thoroughly feasible thermochemical processes have been developed.

SUMMARY OF THE INVENTION

It is thus an object of this invention to provide a process for producing hydrogen.

It is a further object to provide a closed thermochemical process for producing hydrogen.

These as well as other objects are accomplished by reacting cuprous chloride with hydrochloric acid to produce hydrogen gas and cupric chloride. The process in its preferred form comprises a series of four reactions utilizing chlorides of copper and magnesium, hydrochloric acid, and magnesium oxide to break water down into its constituent elements.

BRIEF DESCRIPTION OF THE DRAWING

The single FIGURE of drawing is a flow diagram of the process according to this invention.

DETAILED DESCRIPTION

According to this invention it has been found that cuprous chloride can be reacted with hydrochloric acid to produce hydrogen as a product thereof. The reaction 1. $2CuCl_{(s)} + 2HCl_{(g)} \rightarrow 2CuCl_{2(s)} + H_{2(g)}$ is thermodynamically unfavorable having a positive free energy change of about 26 kcalories at 300°K. The equilibrium constant for the reaction at 300°K is about $10^{-18}$. Thus if the partial pressure of HCl is one atmosphere, the partial pressure of hydrogen is only about $10^{-18}$ atmospheres. This hydrogen pressure is relatively minute and quite impractical for a realistic application.

However, it has been found that by removing the hydrogen thus formed and carrying out the reaction within a solvent for the $CuCl_2$ product, the reaction proceeds significantly to the right. Dimethyl formamide has been found to be a suitable solvent. Other suitable solvents include the chlorides of dimethyl formamide, pyridine, and dimethylamine. Chloroaluminate mixtures of $NaAlCl_4$ and $KAlCl_4$ are also useful as a solvent.

Reaction (1) is preferably carried out in a glass-lined vessel with gas introduction means in the bottom of the vessel and gas extraction means in the top of the vessel. Means should also be provided within the sides of the vessel for liquid introduction and extraction, particularly when the process is carried out in the preferred mode which is more fully described below. It is preferred to carry out the reaction by bubbling gaseous HCl through the reaction solution. It is preferred not to use an inert carrier with the HCl; however, for safety reasons a carrier gas may be desired. While the preferred temperature is 310°K, the reaction may be carried out at temperatures from 298°K up to 600°K. Above 600°K the $CuCl_2$ product begins to decompose. However, no advantage has been found at temperatures above 310°K.

The hydrogen is recovered from reaction (1) by continuously exhausting the reaction atmosphere and subjecting the contents thereof to distillation. The first distillate is HCl, at a temperature of about 190°K, which is recycled for further use in reaction (1) as is depicted for reaction (1) in the drawing. From this distillation the hydrogen plus the inert carrier, if any, can either be sent to storage or the carrier may be separated by further cooling. As an alternative to distillation, the hydrogen may be separated from the reaction atmosphere by the use of a semipermeable membrane which is permeable only to hydrogen. Conventional platinum or palladium membranes may be used for such a purpose.

As a further and preferred embodiment of this invention the hydrogen production reaction of this invention is carried out together with three other reactions which have the net effect of breaking water down into hydrogen and oxygen in a thermodynamically favorable manner. The basic overall process of this embodiment is shown in the FIGURE of the drawing. The following four reactions are utilized in carrying out this process.

1. $2CuCl_{(s)} + 2HCl_{(g)} \rightarrow 2CuCl_{2(s)} + H_{2(g)}$
2. $2CuCl_{2(s)} \rightarrow 2CuCl_{(s\ or\ 1)} + Cl_{2(g)}$
3. $2Cl_{2(g)} + 2MgO_{(s)} \rightarrow 2MgCl_{2(s)} + O_{2(g)}$
4. $MgCl_{2(s)} + H_2O_{(g)} \rightarrow MgO_{(s)} + 2HCl_{(g)}$ By appropriately summing the reactions, the net result is:

$2H_2O \rightarrow 2H_{2(g)} + O_{2(g)}$.

It is thus apparent from the above reactions and the drawing that all reactants with the exception of water are derived as products from the other reactions. Once the process is begun, water is thus the only reactant which is continually added, and hydrogen and oxygen are the only products which are continually removed.

Reactions (2) and (4) have been reduced to practice by others in unrelated processes. Reaction (2) is discussed in S. A. Shchukarev and M. A. Orenskaya, Zhur. Obshchei Khim 24, 1926 (1954); F. Ephraim, Ber. 50, 1069 (1917), referenced in JANAF Thermochemical Tables, 2nd Ed., U.S. Department of Commerce, NSRDS-NBS 37 (1971). Reaction (4) is discussed in "Production of HCl as a Byproduct of the Solvay Process," by R. C. Forrester III and Scott Lynn, CONF-721106 (1972).

Reaction (1) is carried out as is described above. Portions of the solution phase are cycled to a conventional distillation arrangement where the solvent is removed and reintroduced into the environment of reaction (1). In the case of dimethyl formamide, a temperature of about 425°K is required to boil off the solvent and leave the $CuCl-CuCl_2$ mixture. To carry out reaction (2), the chloride mixture is heated to a temperature within the range of 650° to 800° K, and preferably about 766°K. At 766°K the equilibrium pressure of chlorine is one atmosphere. The chlorine is vented for use in reaction (3). By venting the chlorine, reaction (2) goes substantially to completion, and essentially pure CuCl is recovered. The CuCl product is recycled to reaction (1) for use as a reactant.

Reaction (3) is carried out at a temperature within the range of 300° to 550° K, and preferably at a temperature of about 500°K, and at a chlorine pressure of about one atmosphere. Reaction (3) has a free energy change of only about −2.93 kcalories at 500°K and therefore does not readily go to completion. To force the reaction as far to the right as possible, the gaseous environment is continuously exhausted to separate the oxygen product from the reaction environment. While the preferred chlorine pressure is given as one atmosphere, it is readily apparent that higher chlorine pressures improve not only the product yield but also the kinetics of the reaction. However, increases in chlorine pressure complicate containment and separation problems. Reaction (3) is thus preferably carried out in a fluidized bed using MgO particles with $Cl_2$ as the fluidizing gas. Chlorine is thus introduced at the bottom of the fluidized bed reactor and the gaseous environment at the top of the reactor is exhausted for the recovery of oxygen. The extracted gases will normally contain both oxygen and chlorine. By cooling the mixture to about 239°K, chlorine is liquefied for reuse and the oxygen passed on to storage. The oxygen thus produced is a valuable by-product of this process.

Reaction (4) is carried out at a temperature within the range of 800° to 1000° K, and preferably about 900°K, and at an $H_2O$ pressure within the range of 1–10 atmospheres. As with the chlorine pressure in reaction (3), the $H_2O$ pressure in reaction (4) should be as high as is practical for increased product yield and reaction rate. However, for reasons of practicality, the $H_2O$ pressure is maintained at that pressure which is operable within a fluidized bed. Reaction (4) also has MgO and $MgCl_2$ as the solid phase and is also carried out in a fluidized bed in conjunction with reaction (3). The solid phase of reaction (3) is thus preferably continuously or intermittently moved from the bottom of the fluidized bed for reaction (3) to the top for removal and introduction to the bottom of the fluidized bed for reaction (4). Reaction (4) is then carried out by using steam as the fluidizing gas and exhausting the gaseous environment at the top of the reactor for recovery of HCl. By using a fluidized bed of sufficient height, HCl of adequate purity is recovered for reuse in reaction (1). However, the gaseous environment of reaction (4) may be subjected to distillation to separate water and HCl. The separated water is reused in reaction (4) and the HCl used as a reactant in reaction (1). The solid contents of the fluidized bed reactor for reaction (4) are either continuously or intermittently moved upward for removal at the top of the reactor and introduction into the bottom of the fluidized bed reactor for reaction (3).

It is thus seen that the process of this invention provides a closed method for effectively splitting water into hydrogen and oxygen. While the splitting of water is a thermodynamically unfavorable reaction, the process of this invention provides an energetically favorable method for obtaining hydrogen and oxygen from water which is produced by cyclically carrying out the various reactions at different temperatures.

Having described the process of this invention, the following specific example is given of the hydrogen producing step of this invention.

EXAMPLE

Reaction (1) was carried out by bubbling gaseous HCl, diluted with Ar, through a liquid containing dispersed solid CuCl. This was performed in a 5-necked glass vessel provided with a stirrer, thermocouple well, solvent-addition reservoir, inlet and outlet gas lines. The exiting gases were bubbled or passed through conventional reagents to remove excess HCl and then through a thermal conductivity "Gow Mac" cell to measure the hydrogen concentration. The glass container was surrounded by a heating mantle for operations at temperatures above ambient (298°K). Typically 4–10 g CuCl, previously purified by washing with diluted HCl and dried under vacuum, was dispersed in 70–100 cc dimethyl formamide. Argon with variable concentrations of HCl was bubbled through at flow rates of about 200–400 cc/min. The argon-HCl mixture was regulated so as to maintain the hydrogen volume percentage in the exiting gases at 4% or less, which is required as a safety factor in installations not adapted for the handling of high hydrogen concentrations. The liquid phase of the reaction solution usually turned yellow, then colorless, then yellow again, and finally brown, the color of anhydrous $CuCl_2$. Variable concentrations of hydrogen were detected, the concentrations being higher with higher concentrations of HCl in the sparging mixture. Since air and other gases extraneous to the system effect positive readings in the thermal conductivity cell, the gases exiting the cell were analyzed by mass spectrometry to confirm the presence of hydrogen. About 16 runs were performed. In about 5 of them the dimethyl formamide was diluted with different amounts of chloroform, with no significant effects on the reaction. The hydrogen concentrations of the gas mixture exiting the reaction vessel varied from 0.2 to 3 percent when analyzed by mass spectrometry and 0.4 to 3.8 percent by thermal conductivity. This difference is attributed to the presence of CO, originated by traces of formic acid present as an impurity in the dimethyl formamide.

It is thus seen that the process of this invention has dual aspects. In one aspect a thermodynamically unfavorable reaction is caused to proceed and produce hydrogen. In the other aspect this reaction is combined with three other reactions which gives a net result of splitting water into its constituent elements. Various modifications of the disclosed process of this invention are apparent and are included within the scope of the appended claims.

What is claimed is:

1. A process for generating hydrogen, comprising the steps of:

adding CuCl to a liquid solvent for $CuCl_2$;

maintaining said solvent at a temperature within the range of 298° to 600°K;

bubbling HCl through said solvent and thus affecting a reaction between said CuCl and said HCl with said solvent to produce $CuCl_2$ and $H_2$ as products thereof;

exhausting the gaseous atmosphere above said reaction and recovering said $H_2$ therefrom.

2. The process according to claim 1 further comprising:

decomposing said $CuCl_2$ by heating to produce CuCl and $Cl_2$;

using the CuCl in said step of reacting;

reacting said $Cl_2$ with MgO to produce $MgCl_2$ and $O_2$;

separating said $O_2$ from the reaction environment as a by-product;

separating said $MgCl_2$ from the reaction environment;

reacting said $MgCl_2$ with water to produce MgO and HCl;

separating said produced MgO from the reaction environment;

using the separated MgO as a reactant in said second-mentioned step of reacting;

separating said produced HCl from the reaction environment; and using said separated HCl as a reactant in said first-mentioned step of reacting.

3. The process according to claim 1 wherein said solvent is selected from the group consisting of dimethyl formamide and the chloride of dimethyl formamide.

4. The process according to claim 1 wherein said solvent is a mixture of aluminum-sodium-chloride and aluminum potassium chloride.

* * * * *